(12) United States Patent
Lake

(10) Patent No.: US 6,325,417 B1
(45) Date of Patent: *Dec. 4, 2001

(54) ARRANGEMENT FOR SAFETY-BELT

(75) Inventor: Jan Lake, Göteborg (SE)

(73) Assignee: AB Volvo (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/713,528

(22) Filed: Nov. 15, 2000

Related U.S. Application Data

(63) Continuation of application No. 09/091,437, filed on Sep. 29, 1998.

(30) Foreign Application Priority Data

Dec. 29, 1995 (SE) ...................................... 9600002

(51) Int. Cl.⁷ ................................................ B60R 22/00
(52) U.S. Cl. ............................................ 280/808; 297/483
(58) Field of Search ............................... 280/801.1, 802, 280/808; 297/468, 469, 483, 485, 486; 24/265 BC, 265 AL

(56) References Cited

U.S. PATENT DOCUMENTS

| | | | |
|---|---|---|---|
| 3,510,151 | 5/1970 | Weman | 280/150 |
| 3,567,247 | 3/1971 | Sobkow et al. | 280/150 |
| 4,832,366 | 5/1989 | Corbetti et al. | 280/808 |
| 4,915,413 | 4/1990 | Meyer | 280/801 |
| 5,358,310 | 10/1994 | Nemoto | 297/483 |
| 6,042,190 | 3/2000 | Mathe et al. | 297/483 |

FOREIGN PATENT DOCUMENTS

| | | |
|---|---|---|
| 2 032 772 | 2/1971 | (DE) . |
| 2032772 | 2/1971 | (DE) . |
| 37 41 831 C2 | 11/1991 | (DE) . |
| 41 36 914 C1 | 2/1993 | (DE) . |

*Primary Examiner*—Paul N. Dickson
*Assistant Examiner*—Faye M. Fleming
(74) *Attorney, Agent, or Firm*—Lerner, David, Littenberg, Krumholz & Mentlik, LLP

(57) ABSTRACT

An arrangement for seat-belts for vehicles having a seat for a passenger, an area where the passenger has his shoulder when seated in a normal position, a forward direction and a rearward direction, comprises a belt which runs from the area in the vehicles where the passenger has his shoulder when seated in a normal position to an attachment point at the side of the passenger. The arrangement has connection means fixed to the vehicle behind the seat for moving the belt in a rearward direction, keeping the belt at the passenger's shoulder so that the belt is in contact with the passenger regardless of the angle of the seat's backrest.

4 Claims, 5 Drawing Sheets

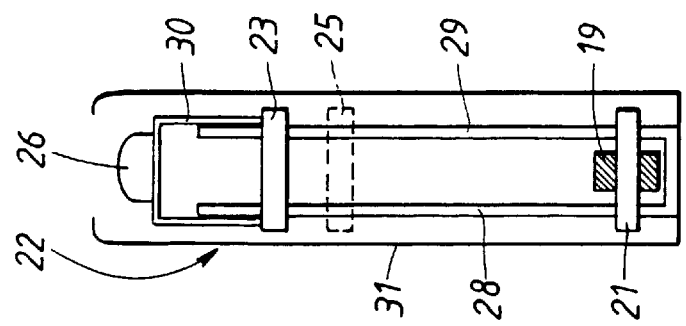
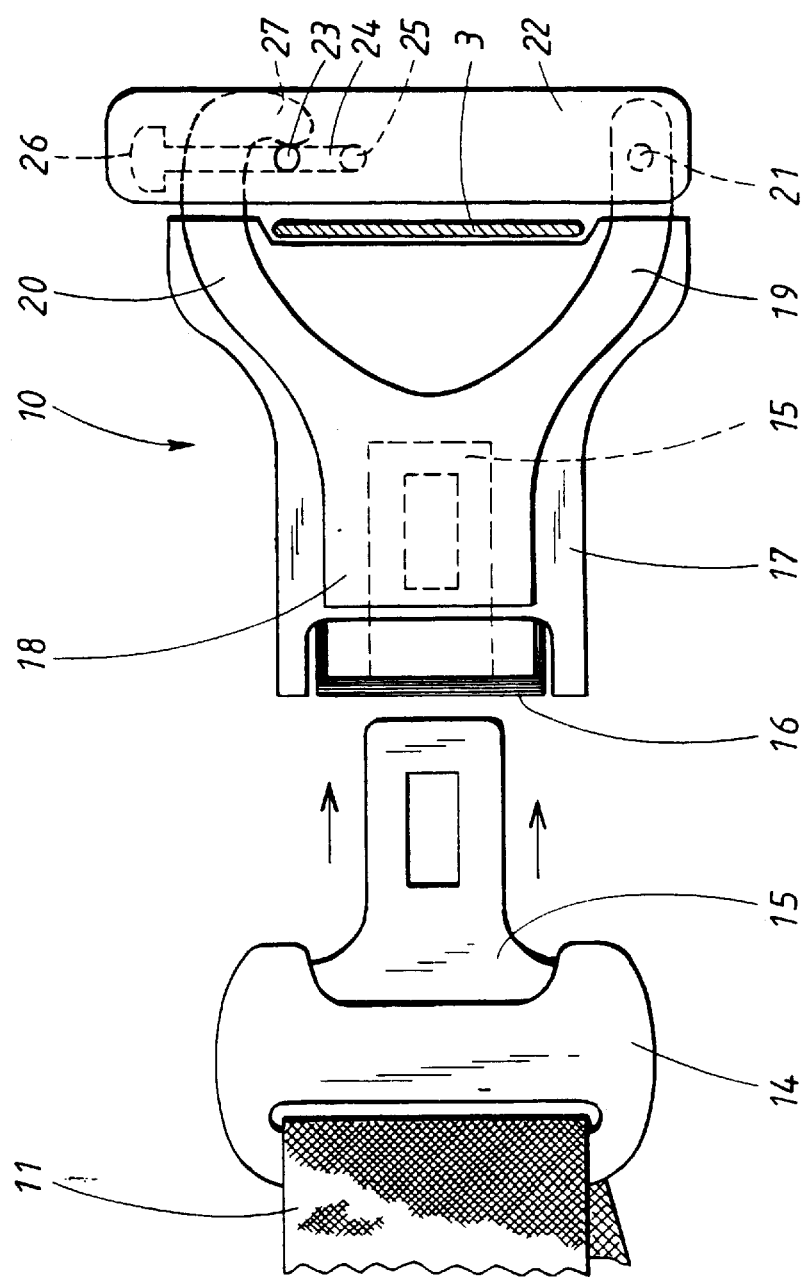

ARRANGEMENT FOR SAFETY-BELT

CROSS-REFERENCE TO RELATED APPLICATIONS

This application is a continuation of U.S. patent application Ser. No. 09/091,437, filed Sep. 29, 1998, the disclosure of which is hereby incorporated by reference herein.

FIELD OF THE INVENTION

The present invention relates to an arrangement for a safety-belt. In particular, the main application of the invention is in connection with safety-belts for motor vehicles.

BACKGROUND OF THE INVENTION

In vehicles, particularly in passenger cars, safety-belts are normally used to secure those travelling in the vehicle. In a known manner, the safety-belts add to the safety of those travelling in the vehicle. A common kind of safety-belt is the so-called three-point belt which comprises a belt attached to a retracting device which is normally arranged on the body of the vehicle, at the side of the seats. The belt runs from the retracting device, across the torso of the passenger or driver. Normally, at the level of the one shoulder of the passenger or the driver, there is an upper belt guide through which the belt runs. The belt is fastened by a locking means at an attachment point on the side of the driver or the passenger. The belt also runs through a guide at this attachment point, and runs across the waist of the driver or passenger. Finally, the belt is fixedly attached to the floor of the vehicle on the opposite side of the driver or passenger relative to the attachment point.

In terms of the function of the safety-belt, it is an important requirement that the above mentioned upper belt guide is arranged so that the belt runs through it at a point close to the shoulder part of the driver or passenger when sitting in an upright position, i.e. with the back rest in an upright position. In this way optimal protection can be obtained from the safety-belt in a possible collision. The belt in this manner runs through the belt guide close to the shoulder of the driver or passenger, across the chest of the driver or passenger, through another belt guide at the lower attachment and guide point, and across the waist of the driver or passenger towards the fixation point.

Although conventional seat belts of the three-point type provide good protection in most normal situations they are somewhat inadequate in those cases where the driver or passenger sits in a position somewhat different from the normal, i.e. upright position, which has been described above. In particular, conventional three-point belts do not provide optimal safety if a passenger wishes to recline the backrestin order to rest or sleep when travelling in the vehicle. This is particularly relevant for a passenger who sits in the passenger seat next to the driver. If the backrest of the seat is reclined, the upper guide point of the safety-belt will be at a point a long way in front of and above the shoulder of the passenger. Thus, the safety belt cannot provide optimal protection in case of a collision.

SUMMARY OF THE INVENTION

An arrangement for a frontseat belt in a vehicle in which the vehicle has a frontseat for a passanger, an area where the passanger when seated in a normal position in the front seat has a shoulder, a forward direction comprising a direction of travel of the vehicle, and a rearward direction, comprises a front seatbelt which runs from the area in the vehicle where the passanger when seated in a normal position in the frontseat has a shoulder to a lower attachment point at the side of the passanger. A rear seatbelt is fixed to the vehicle behind the frontseat. The rear seatbelt is adapted for moving the frontseat belt in the rearward direction and keeping the front seatbelt at the passanger shoulder so that the front seatbelt is in contact with the passanger regardless of the angle of the seats backrest.

Preferably, a locking unit is attached to the front seatbelt for connecting the front seatbelt with the rear seatbelt. The locking unit preferably comprises a locking element for locking the belts. The locking element preferably has a first arm, a second arm and a lock shackel which is rotatably arranged on one of the arms. The second arm preferably comprises a locking means for locking interaction with corresponding locking means on the lock shackel. The first arm and second arm are preferably arranged for designation in case of collison so that the arms move towards each other to secure the belt.

DESCRIPTION OF THE DRAWINGS

The invention will be described in greater detail in the following with reference to the appended drawings, in which:

FIG. 5 is a view of the locking means in FIG. 4, in its locking position, FIG. 6 is a cross-section of a locking shackle, which preferably is comprised in the invention.

DETAILED DESCRIPTION OF PREFERRED EMBODIMENTS

Figure 1:
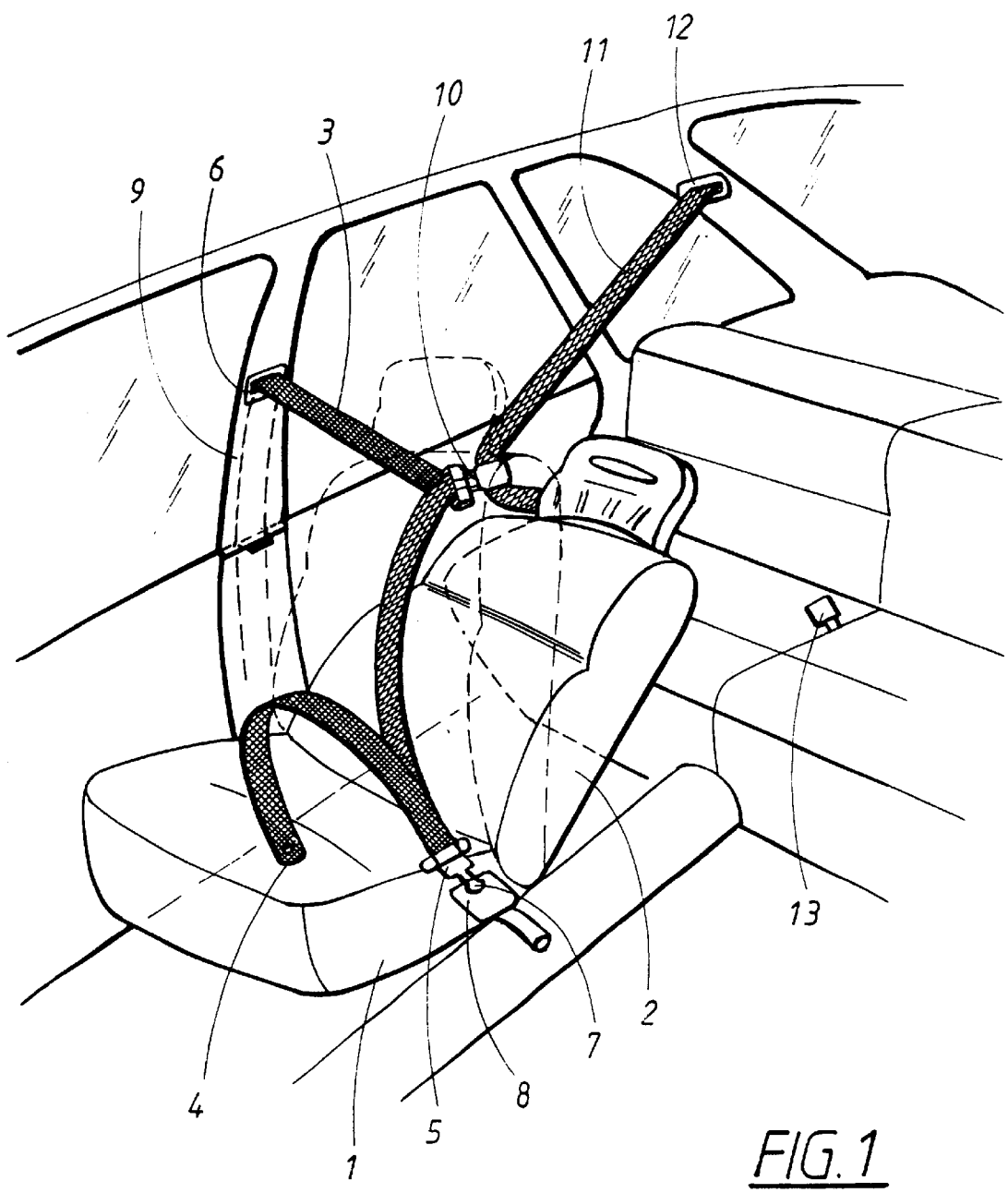
FIG. 1 is a perspective view of a passenger compartment of a vehicle, which shows an arrangement according to the present invention and the application thereof.

FIG. 1 shows a perspective view of a passenger compartment in a motor vehicle, where the invention preferably can be applied. The drawing shows a vehicle front seat 1 with a corresponding backrest 2. The backrest 2 is shown with dashed lines in its normal position and with solid lines in a position somewhat reclined.

The vehicle is in a conventional manner equipped with a safety-belt with a forward belt 3 arranged in connection with the front seat 1. The forward belt 3 runs from an attachment 4 in the floor of the vehicle, via a lower guiding point 5 and across an upper guiding point 6. The lower guiding point 5 consists of a conventional belt lock through which the belt 3 runs. The belt lock 5 comprises a locking tongue 7 which can be locked in a locking means 8. The locking means 8 is in turn fixedly attached to the floor of the vehicle.

At the upper guiding point 6 the forward belt 3 runs in a known manner through an opening in a panel 9 in the side of the vehicle. The belt 3 is retracted onto a (not shown) belt roll which is arranged behind the panel 9. In a known manner, the belt roll is arranged to automatically retract the front belt 3 when it is not in use. The upper guiding point 6 is arranged close to a point where a passenger sitting upright has his one shoulder. From this it will become apparent that the front belt 3 will provide optimal protection effect when the backrest 2 is in its upright position.

According to what has been described initially, there is in earlier known arrangements a problem regarding insufficient protection from the safety belt in those cases where the passenger in the seat 1 wishes to recline in order to rest or to sleep, and for this reason reclines the backrest 2. In order to solve this problem, the present invention comprises a special locking unit 10, the construction and function of which will be described in more detail below. The object of the locking unit 10 is to connect the front belt 3 with a rear belt 11, which in most passenger cars is arranged to be used by passengers in the back seat.

According to the invention the rear belt 11 has the same principal construction as the forward seat-belt 3, and comprises a second upper guiding point 12 and a second lower guiding point 13, where the latter also constitutes an attachment for the rear belt 11. In a known manner, the rear belt 11 is attached to a (not shown) rear belt roll by means of which it is automatically retracted when it is not in use.

Figure 2:
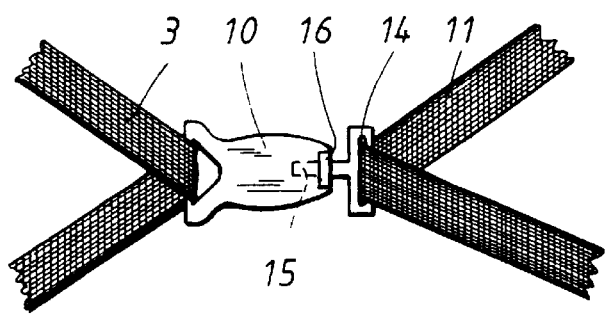
FIG. 2 is a somewhat enlarged view which shows the locking means according to FIG. 1.

As can be seen in FIG. 2, the locking unit 10 is a separate component which can be attached between the forward safety belt 3 and the rear safety-belt 11. The forward belt 3 can be guided through the locking unit 10, while the rear belt 11 is locked in the locking unit 10 by means of a rear belt lock 14, which comprises a locking tongue 15 which can be fixed in a corresponding fixing means 16 in the locking unit 10. The fixing means 16 of the locking unit 10 is of the same conventional kind as the above mentioned fixing means 8 and 13, respectively and comprises a release button for the release of the locking tongue 14 when the rear belt 11 is to be released.

Figure 3:
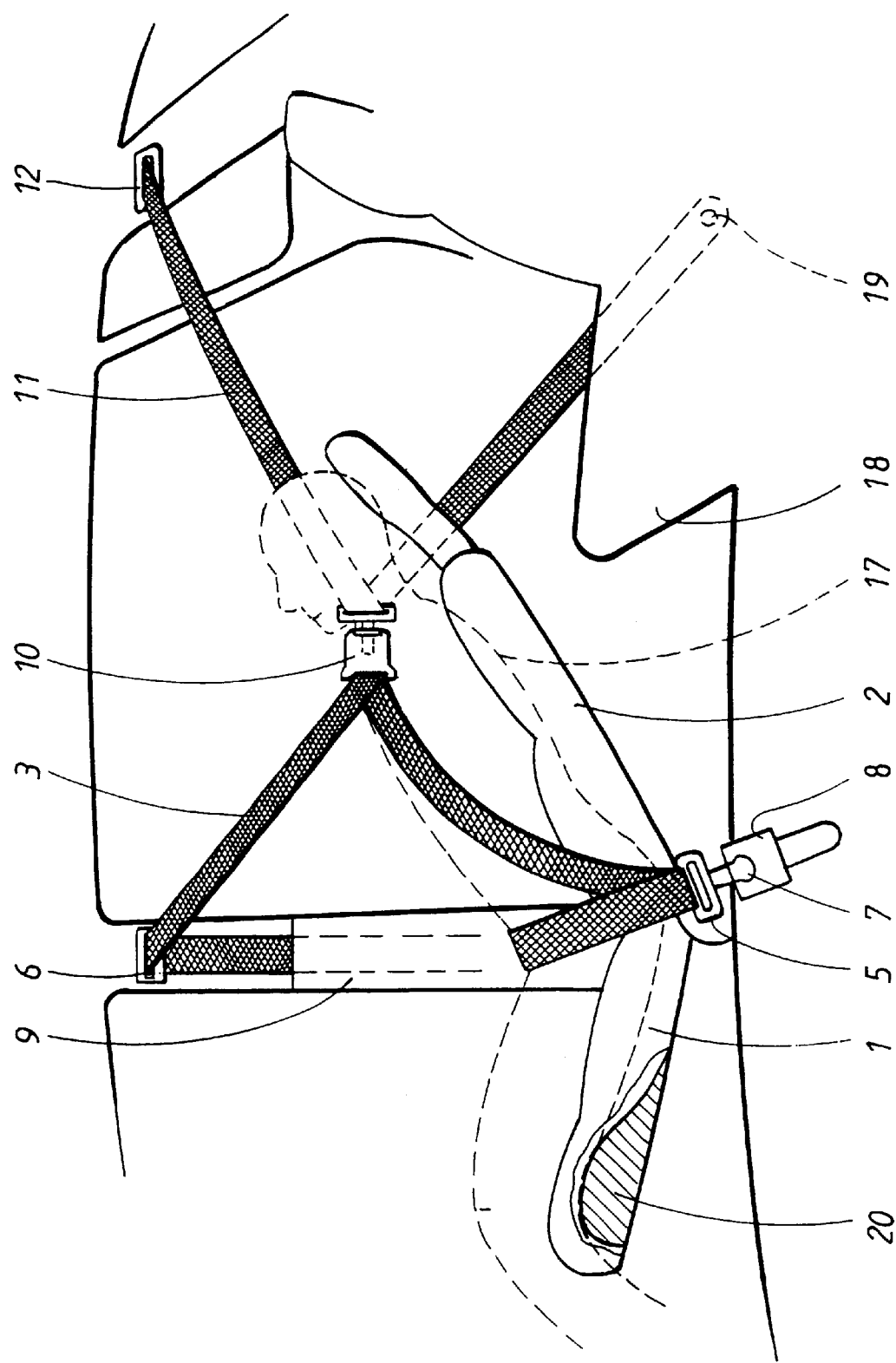
FIG. 3 is a side view of the arrangement in FIG. 1.

FIG. 3 shows a side view of the arrangement according to the invention. In the drawing, a passenger 17 is indicated by dashed lines. The passenger 17 has positioned the back rest 2 to sleep or rest. In connection with this, the locking unit 10, has been attached to the forward belt 3, and the rear belt 11 has thereafter been fastened to the locking unit 10 as has been described above. The rear safety-belt 11 can thus no longer be used by somebody travelling in the back seat 18 of the vehicle, instead the rear belt 11 runs from the (not shown) rear belt roll at the second upper guiding point 12 and forward to the locking unit 10. The rear belt 11 further runs to its attachment 19 at the floor of the vehicle, where it is fixedly attached.

From FIG. 3 it can be seen that the upper guiding point 6 of the front belt 3 has been moved to a position immediately adjacent to the shoulder of the passenger 17. The part of the rear belt 11 which runs forwards to the locking unit 10 here constitutes an "extension" of the front belt 3. Optimal protection effect is in this way provided for the passenger even when he has the backrest 2 in a non-upright position, since the belt will always adopt a correct position, regardless of the angle of the backrest. In a possible collision the passenger 17 will be protected just as safely as if he were sitting upright and were using the forward belt in a conventional manner.

In order to further improve the safety, the front seat 1 is preferably equipped with a protecting means 20 in order to prevent the passenger 17 from, in the event of a collision, submarining under the front belt 3. The submarining protector is a pillow-like element which is arranged where the passenger 17 normally has his thighs. In this way, forward motion of the passenger in case of sudden braking or a collision is revented.

Figure 4:
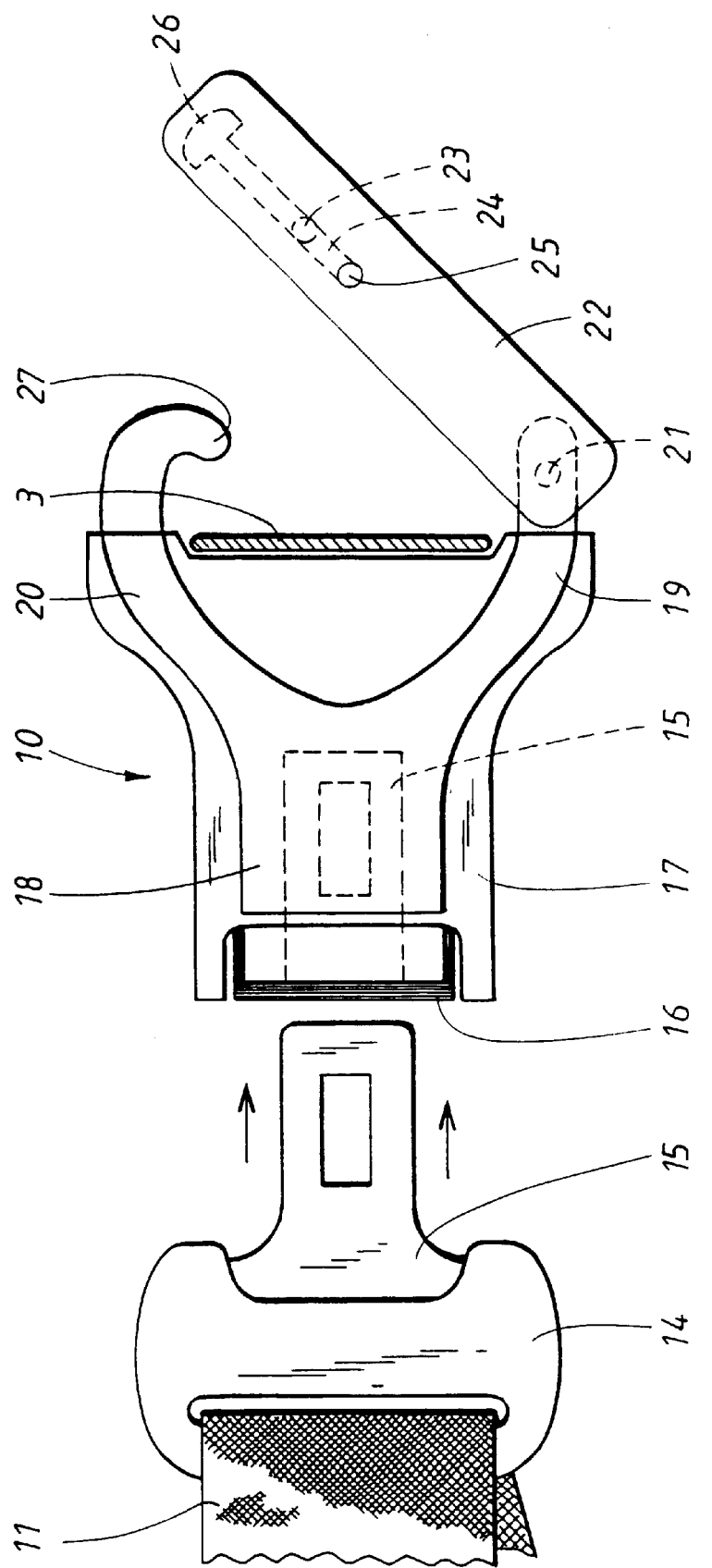
FIG. 4 is a detailed view of a locking means which is part of the present invention, in an open position.

FIG. 4 shows the locking unit 10 according to the invention, in detail. The locking unit 10 comprises a fixing means 16 of an essentially conventional kind, arranged in a casing 37. In this way the belt lock 14 for the rear belt 11 can be locked in the locking unit 10 by moving it in the direction indicated by arrows. In the drawing, the locking tongue of the belt lock 14 is shown in the locking position with dashed lines. In a conventional manner, the fixing means 16 comprises a release button for therelease of the belt lock 14 from the locking unit 10.

When the locking tongue 15 has been locked, it is fixedly connected to (a locking element 18 which is shaped like a yoke with two protruding arms 19, 20. The locking element 18 is preferably made of metal. The first arm 19 comprises an axial pin 21, about which a lock shackle 22 is rotatably arranged. There is further provided a locking pin 23 in the lockshackle 22, substantially parallel to the axial pin 21. The locking pin 23 can be moved in a slot 24 along the lock shackle 22 and can assume an upper and alower position. The lower position is denoted by reference numeral 25. The locking pin 23 is moved towards the upper position by means of a (not shown) spring element in the lock shackle 22. The arrangement with the spring element will be described below, with reference to FIGS. 7 and 8. As will become apparent below, the locking pin 23 can be moved towards the lower position 25 by means of a push button 26.

The second arm 20 of the locking element 18 has an end section 27 which is essentially hook-shaped. When the locking unit 10 is to be used, i.e. when the front belt 3 is to be locked in the locking unit 10, the front belt 3 is placed in the position shown in FIG. 4. In this position, the belt is in contact with a rounded surface of a tube of hardened plastic which is part of the locking element 18. Thereafter, the lock shackle 22 is rotated towards its locked position, which is shown in FIG. 5. In so doing, the push-button 26 is depressed, so that the locking pin 23 can pass the outermost tip of the end section 27 of the second arm 20.

With reference to FIG. 5, the locking unit 10 is shown in its locked position. From this it will become apparent that the locking pin 23 fixes the lock shackle 22, since the locking pin 23 here is in its upper position behind the book-shaped end section 27 of the second arm 20. In this position,the belt 3 is locked but still mobile, since the locking shackle 22 is not in direct contact with the belt 3 so that it is locked.

FIG. 6 shows a cross-section of the principal construction of the lock shackle 22. From the drawing it will become apparent that the lock shackle 22 comprises two side walls 28, 29 between which the locking pin 23 is arranged. The push-button 26 is also arranged between the side walls 28, 29, and is connected with a yoke-shaped part 30, by means of which the locking pin 23 can be manipulated. The lock shackle 22 is surrounded by a housing 31.

When the passenger wishes to use the invention, the belt lock 14 is locked in the locking unit 10. The front belt 3 is then placed in the position shown in FIGS. 4 and 5. The jock shackle 22 is then swung into position, after which the belt 3 runs around the lock shackle 22. In a possible collision, a strong tractive force will influence the locking element 18, causing the two arms 19, 20 to strive to move towards each other, i.e. so that the angle between the arms 19, 20 will decrease. This, in turn, will cause the belt 3 to become trapped between the arms 19, 20. In this way a secure locking of the belt 3 in the locking unit 10 is obtained in case of a collision.

Figure 7:
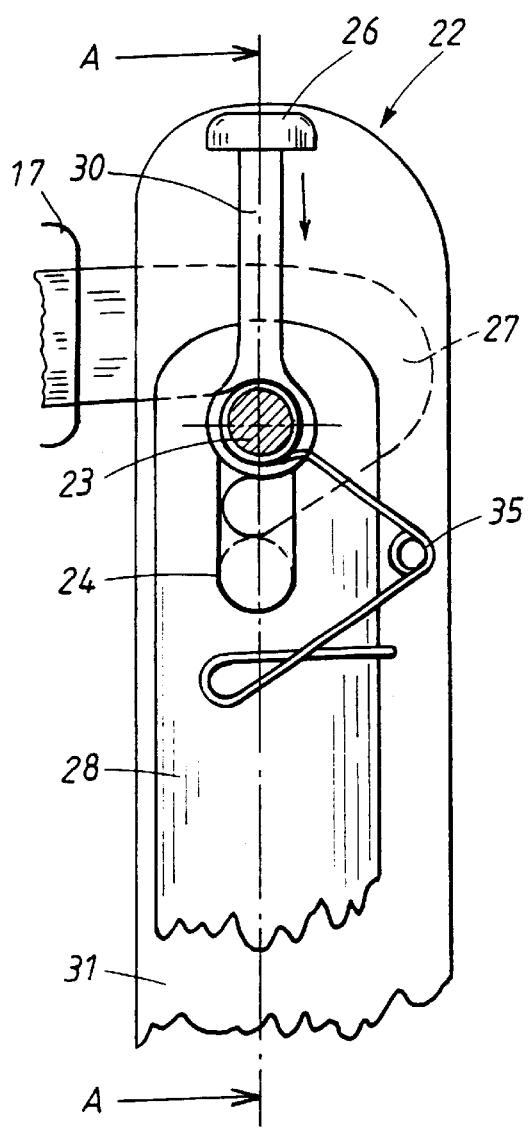
FIG. 7 is an enlarged view of a part of the locking shackle in FIGS. 4 and 5.
Figure 8:
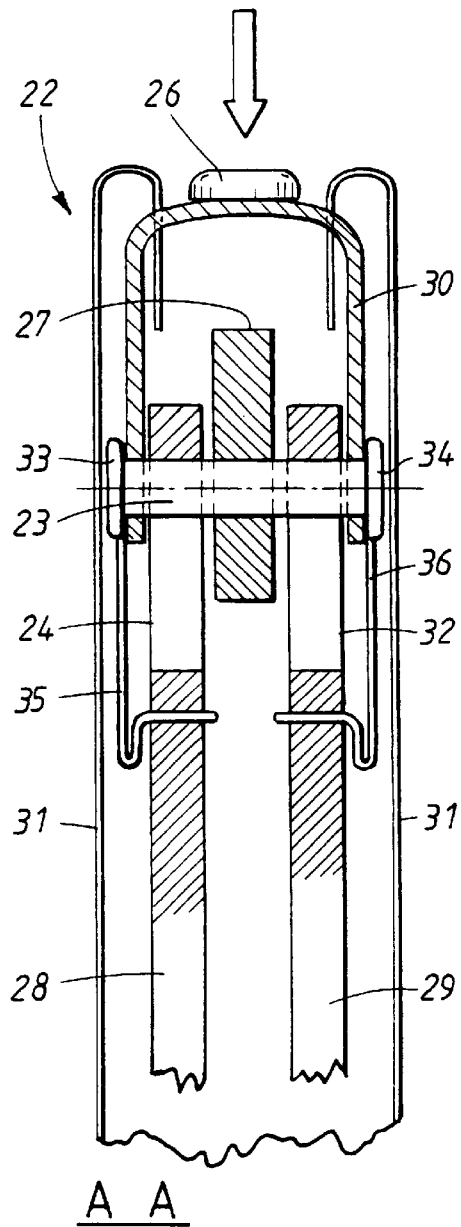
FIG. 8 is a cross-section along the line A—A in FIG. 6.

FIG. 7 shows an enlarged side view of the upper part of the locking shackle 22 and of the hook-shaped end section 27 of the locking element 18. The lock shackle 22 is shown in its locking position, i.e. with a locked belt (of FIG. 5). FIG. 8 further shows a cross-section along the line A—A of FIG. 7. According to the embodiment shown in these drawings, the lock shackle 22 comprises two side walls 28, 29 and a surrounding casing 31. The side walls 28, 29 are equipped with one groove each 24, 32, along which the locking pin 23 can be moved. The locking pin 23 is further prevented from being axially displaced out of the groove, since it comprises end sections 33, 34 with a diameter which is somewhat larger than the width of the groove 24, 32.

The locking pin 23 is biased towards an upper position in the grooves 24, 32 by means of a spring arrangement which comprises two springs 35, 36. One end of each spring 35, 36 is in contact with its corresponding side wall 28, 29, and the other end is in contact with the locking pin 23. Due to the spring force from the springs 35, 36, the locking pin 523 strives to move upwards.

The locking pin 23 can be moved downwards by displacing the push-button 26 in the direction indicated with arrows in FIGS. 7 and 8. The push-button 26 is in turn connected to a yoke-shaped element 30, the end sections of which are arranged around the locking pin 23. The upper part of the housing 31 preferably comprises a (not shown) groove or the like, so that the yoke 30 is maintained in an essentially vertical position.

When the push-button 26 is depressed, the locking pin 23 moves downwards in the direction of the force from the spring arrangement, so that the respective springs 35, 36 are compressed. When the locking pin 23 is below the hook shaped end section 27, the lock shackle 22 can swing out to its open position, so that a belt which has been locked in the locking unit 10 can be removed. In a similar manner the push-button 26 can be depressed when the locking shackle 22 is to be moved to its locking position.

The hook-shaped end section 27 and the springs 35, 36 can be shaped so that the push-button does not need to be depressed when closing the lock shackle 22. Instead the locking pin 23 can be depressed when, during the closing of the lock shackle 22, it comes into contact with the outside of the end section 27. When the locking pin 23 has passed the lowest point of the end section 27, it will, due to the force from the springs 35,36, move up to its upper position. In this manner,the locking shackle 22 can be closed without influencing the push-button 26.

The invention is not limited to the described embodiments but can be varied within the scope of the appended claims. It is for example not necessary to use an existing rear seat-belt in order to move the guiding point of the front belt, this can also be done with a belt with a spring arrangement which will pull the front belt 3 backwards and downwards. This can be the case in a vehicle not equipped with a back seat.

What is claimed is:

1. An arrangement for a front seat-belt for a vehicle having a front seat for a passenger, an area where the passenger when seated in a normal position in the front seat has his shoulder, a forward direction comprising the direction of travel of the vehicle, and a rearward direction, comprising:

a) a front seat-belt adapted to extend from the area where the passenger when seated in a normal position in the front seat has his shoulder to a lower attachment point at the side of the passenger;

b) a rear seat-belt adapted to be affixed to the vehicle behind the front seat, said rear seat-belt further being adapted for moving said front seat-belt in the rearward direction and keeping said front seat-belt at the passenger's shoulder so that said front seat-belt is in contact with the passenger regardless of the angle of the seat's backrest.

2. The arrangement of claim 1, further comprising a locking unit attached to said front seat-belt for connecting said front seat-belt with said rear seat-belt.

3. The arrangement of claim 2, wherein said locking unit comprises a locking element for locking said belt having:

a) a first arm, a second arm, and a lock shackle which is rotatably arranged on one of said arms, b) said second arm comprising locking means for locking interaction with corresponding locking means on said lock shackle and c) wherein said first arm and said second arm are arranged for deformation in case of collision so that said arms move towards each other, thus securing said belt.

4. A vehicle equipped with an arrangement in accordance with any one of claims 1–3.

* * * * *

UNITED STATES PATENT AND TRADEMARK OFFICE
CERTIFICATE OF CORRECTION

PATENT NO. : 6,325,417 B1  
DATED : December 4, 2001  
INVENTOR(S) : Jan Lake

Page 1 of 1

It is certified that error appears in the above-identified patent and that said Letters Patent is hereby corrected as shown below:

Title page,
Related U.S. Application Data, after "Sep. 29, 1998" insert -- , Pat. 6,224,105, which is a 371 of PCT/SE96/01702, filed 12/19/96 --.

Column 1,
Line 6, after "Sep. 29, 1998," insert -- Pat. 6,224,105, --.

Column 4,
Line 4, "37" should read -- 17 --.
Line 12, delete -- ( --.
Line 42, "book" should read -- hook --.
Line 56, "jock" should read -- lock --.

Signed and Sealed this

Thirtieth Day of April, 2002

Attest:

Attesting Officer

JAMES E. ROGAN
Director of the United States Patent and Trademark Office